No. 861,187. PATENTED JULY 23, 1907.
O. W. JOHNSON.
MACHINE FOR FOLDING LETTERS AND THE LIKE.
APPLICATION FILED JULY 14, 1905. RENEWED NOV. 16, 1906.

No. 861,187. PATENTED JULY 23, 1907.
O. W. JOHNSON.
MACHINE FOR FOLDING LETTERS AND THE LIKE.
APPLICATION FILED JULY 14, 1905. RENEWED NOV. 16, 1906.

Witnesses

Inventor
O. W. Johnson
By
Rhd A B Lacey Attorneys

No. 861,187. PATENTED JULY 23, 1907.
O. W. JOHNSON.
MACHINE FOR FOLDING LETTERS AND THE LIKE.
APPLICATION FILED JULY 14, 1905. RENEWED NOV. 16, 1906.

Witnesses

Inventor
O. W. Johnson

By
Attorneys

No. 861,187. PATENTED JULY 23, 1907.
O. W. JOHNSON.
MACHINE FOR FOLDING LETTERS AND THE LIKE.
APPLICATION FILED JULY 14, 1905. RENEWED NOV. 16, 1906.

Witnesses
Inventor
O. W. Johnson.
By
Lacey, Attorney

No. 861,187. PATENTED JULY 23, 1907.
O. W. JOHNSON.
MACHINE FOR FOLDING LETTERS AND THE LIKE.
APPLICATION FILED JULY 14, 1905. RENEWED NOV. 16, 1906.

Witnesses

Inventor
O. W. Johnson.

By
R. H. & B. Lacey, Attorneys

UNITED STATES PATENT OFFICE.

OLIVER W. JOHNSON, OF CLEVELAND, OHIO, ASSIGNOR TO THE CLEVELAND FOLDING MACHINE COMPANY, OF CLEVELAND, OHIO.

MACHINE FOR FOLDING LETTERS AND THE LIKE.

No. 861,187.　　　　Specification of Letters Patent.　　　Patented July 23, 1907.

Application filed July 14, 1905, Serial No. 269,689. Renewed November 16, 1906. Serial No. 343,766.

*To all whom it may concern:*

Be it known that I, OLIVER W. JOHNSON, a citizen of the United States, residing at Cleveland, in the county of Cuyahoga and State of Ohio, have invented certain new and useful Improvements in Machines for Folding Letters and the Like, of which the following is a specification.

While this machine is designed, primarily, for folding letters, it may be adapted for folding circulars and pamphlets either in parallel folds or in folds at a right-angle to one another as may be required.

The invention comprises coöperating pairs of folding rolls and co-acting stop guides to effect buckling or flexing of the sheet preliminary to the next fold.

For a full description of the invention and the merits thereof and also to acquire a knowledge of the details of construction of the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Corresponding and like parts are referred to in the following description and indicated in all the views of the drawings by the same reference characters.

The machine comprises a suitable base 1 and frame 2 mounted thereon, the latter being of such formation as to support the working parts and admit of their various movements and adjustments. A holder 3, for receiving a pile of letters, sheets or the like to be folded, is pivotally supported near its lower end at 4 to the base 1 and it is adapted to be raised and lowered by a pivotal movement to admit of the sheets being conveniently placed in position. This holder consists of a plate 5, adjustable side gage 6 and movable bottom gage 7, whereby the holder may be adapted to the size of the sheets or letters to be folded. A compensating spring 7′ coöperates with the holder to lighten the pressure of the paper on the feed roller. When the holder 3 is in operative position, it occupies an approximately vertical position with the weight to one side of its pivot support 4, as indicated most clearly in Figs. 1 and 2, whereby the upper end is forced by gravitative action towards the feed roll and folding mechanism. When it is required to supply the holder with a pile of sheets to be folded, the upper end of the holder is swung outward and downward to cause the holder to assume an approximately horizontal position, thereby admitting of the paper being conveniently placed in position and the parts 6 and 7 to be adjusted if needs be. After the holder has been filled, it is turned into normal or vertical position.

The feed roll 8 is preferably of rubber and is mounted upon a transverse shaft 9 with which it has ratchet connection in any accustomed way, as by means of the ratchet wheel 10 and spring actuated pawl 11. The feed roll 8 may be of any construction and length, and, as illustrated, is exceedingly short compared with the length of the folding rolls and approximates the form of a wheel or pulley. The shaft 9 is journaled in bearings of the frame 2.

Referring to the holder for the sheets of paper, it is to be understood that the sheets are placed edgewise in the holder and are supported in vertical position on edge with the outermost sheet resting at its upper end in contact with the feed roll 8. The entire holder is supported by the roll 8 alone, as its entire weight is to one side of its pivots 4 when in vertical position. As the roll 8 is turned, it will feed the sheets one at a time by contact with the outermost sheet, upwardly, and the sheets will contact with the uppermost guide 14 and be deflected thereby between the guides 14 and 15 into the rolls 12 and 13. In the present illustration, referring particularly to Figs. 1 and 2 it will be understood that the paper holder is empty, its rear side resting up against the feed roll 8.

Figure 3:
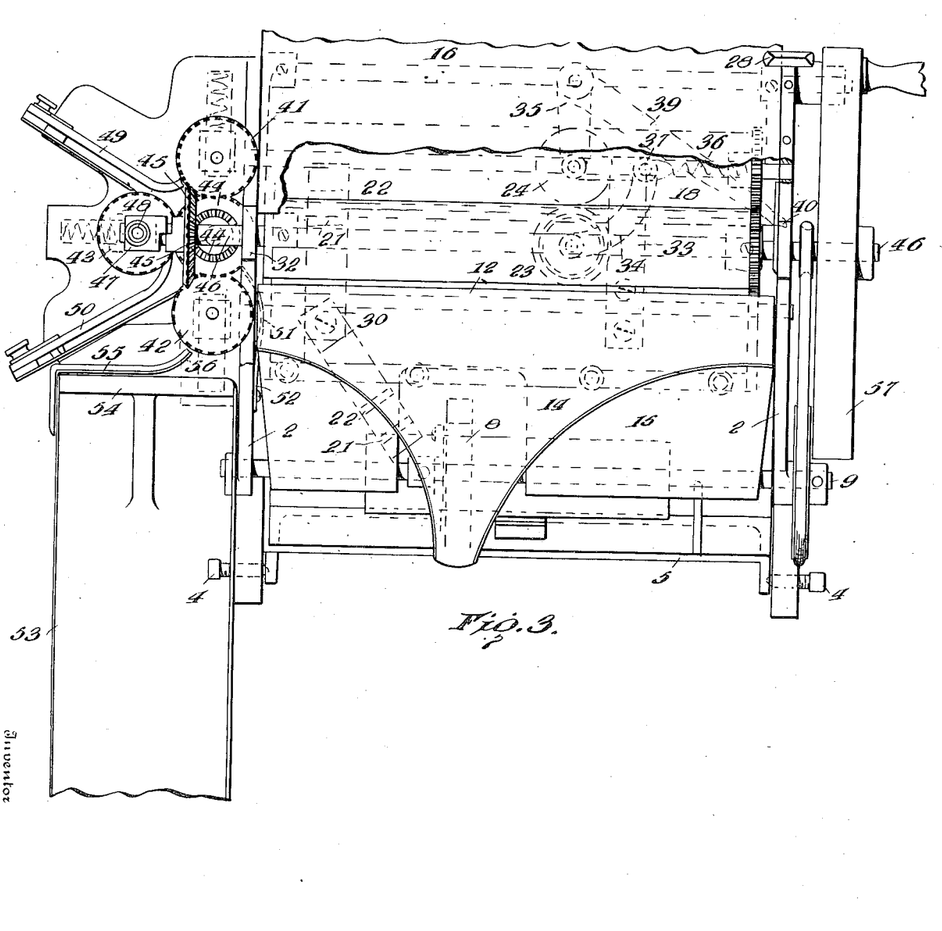
Fig. 3 is a top plan view of the machine, the rear portion of the primary stop guide being broken away.
Figure 4:
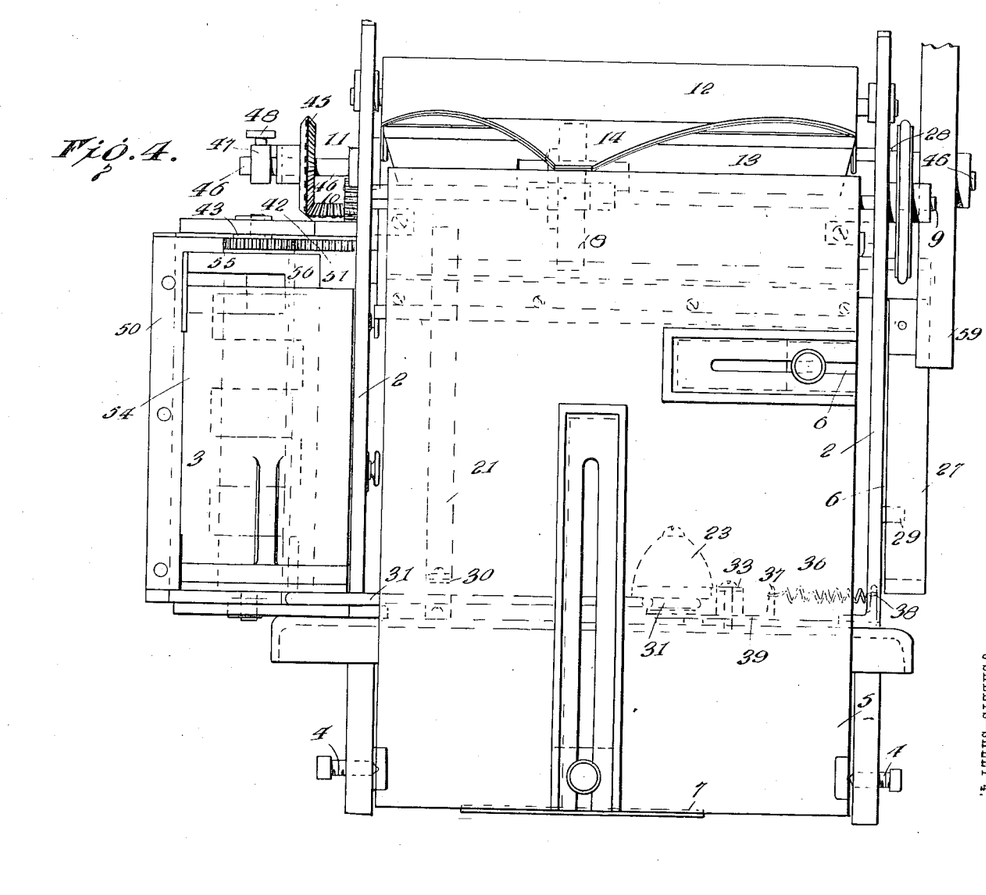
Fig. 4 is a front view of the machine.
Figure 5:
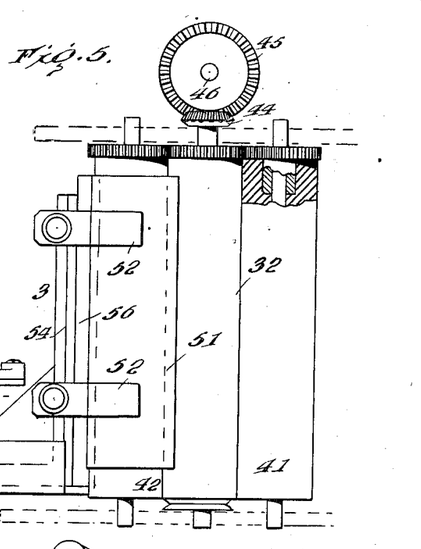
Fig. 5 is a view in elevation of the transverse or letter folding rollers, the receiving end of the rack in which the folded letters, sheets or the like are received and illustrating the means whereby said folding rolls are operated.
Figure 6:
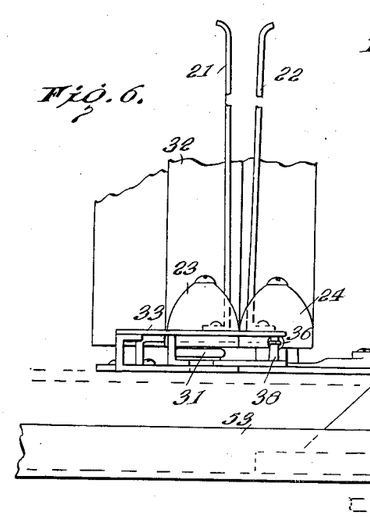
Fig. 6 is a detail view of the guide means for directing the letter or sheet after being doubled upon itself, to the letter or transverse folding mechanism.
Figures 7, 8:
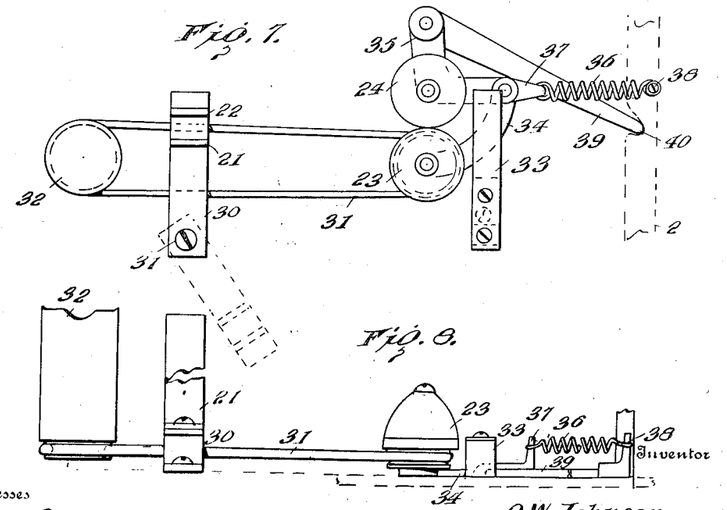
Fig. 7 is a top plan view of the parts shown in Fig. 6, the dotted lines showing the guide bars turned aside.
Fig. 8 is a side view of the parts shown in Fig. 7.

Rolls 12 and 13 are located in vertical alinement, the roll 13 being mounted in stationary bearings, whereas the roll 12 is mounted in yieldable bearings to admit of the roll 12 adapting itself to the thickness of the sheet or paper passing between it and the roll 13. A guide is arranged between the feed roller and the rolls 12 and 13 and comprises upper and lower companion members 14 and 15. The guide members 14 and 15 converge from their receiving end towards the rolls 12 and 13 to insure delivery of the sheet or paper between said rolls. The outer portion of the member 15 is notched or cut away opposite to the feed roll 8 as indicated in Fig. 3, to provide ample clearance therefor, and the corresponding end of the guide member 14 curves over and around the upper outer portion of the feed roll, so as to deflect the upper edge portion of the sheet from the vertical to the horizontal in the initial forward movement of the paper to the folding mechanism. The guide members 14 and 15 preferably consist of sheet metal plates.

Figure 1:
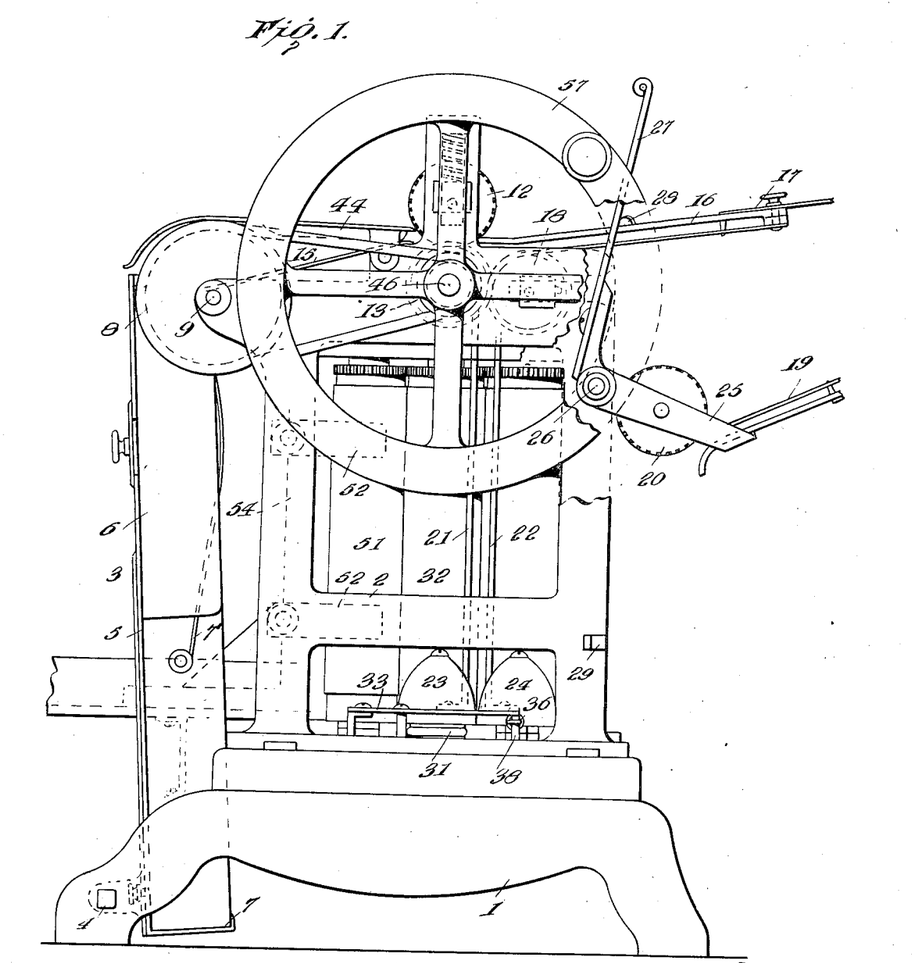
Figure 1 is a side elevation of a letter folding machine embodying the invention and adapted for letter or right angular folding, the legal or parallel folder being thrown out of action.
Figure 2:
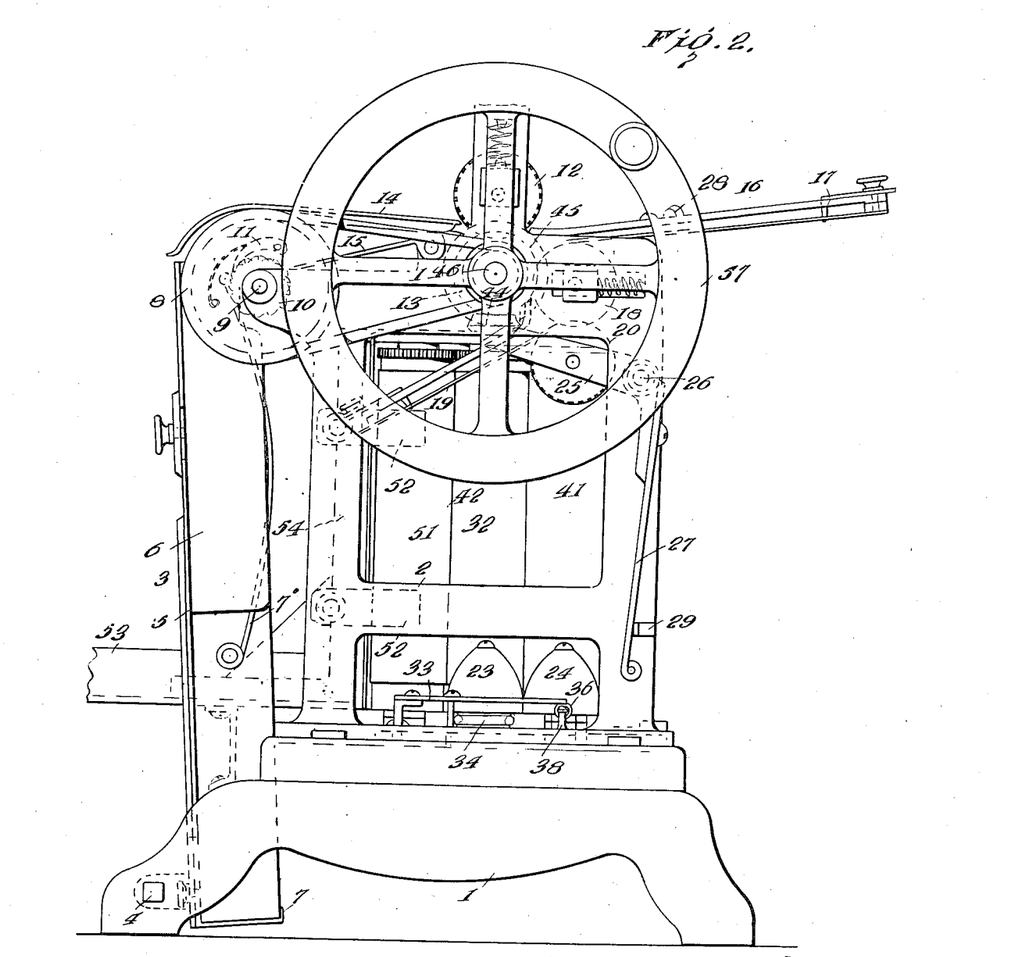
Fig. 2 is a view similar to Fig. 1 showing the means adapted for legal or parallel folding.

A stop guide 16 is located opposite to the space formed between the rolls 12 and 13 and comprises upper and lower spaced members between which an end portion of the sheet is adapted to pass as it emerges from between the rolls 12 and 13, an adjustable stop 17 being located at the outer end of the guide to arrest the forward movement of the sheet so as to cause said sheet to buckle or flex at the predetermined point corresponding to the desired initial fold. The companion members of the guide 16 are flared at the receiving end of the guide to insure entrance of the sheet between them. A roll 18 is located opposite to and in substantial horizontal alinement with the roll 13 and is mounted in yielding bearings to adapt the space between the rolls 13 and 18 to the thickness of material passing between them. The rolls 13 and 18 may be termed the initial or primary folding rolls since they first act upon the sheet or paper when given the initial bend. The space between the companion rolls 13 and 18 is opposite the receiving or entrance end of the guide 16. The rolls 12, 13 and 18 are positioned (all three being considered) in a substantial right angular relation, the roll 13 being directly underneath the roll 12, and the roll 18 maintaining a substantial horizontal arrangement with respect to the roll 13, although in a slightly lower plane. The stop guide 16 extends in a direction or line forming an acute angle with both the rolls 12 and 18 with its entrance close to and between the two. Hence as the sheet is passed between the rolls 12 and 13 into the stop guide 16 and is stopped thereby it will buckle at the entrance end of the guide; and, as the space between the rolls 13 and 18 is close to said entrance end of the guide as before stated, the buckled portion will feed into said space and be caught by rolls 13 and 18 and passed downwardly therethrough to form the first crease or fold. As the paper or sheet, when first folded, passes downward between the rolls 13 and 18 and for legal or parallel folds, an end portion of the folded sheet enters a guide stop 19 similar to the stop guide 16, and when again buckled or flexed passes between the roll 18 and a companion roll 20 located below the roll 18 and in vertical alinement therewith to form the second fold. If the sheet or letter is to be folded at a right-angle to the primary fold, the stop guide 19 and folding roll 20 are thrown out of the way and the sheet is permitted to drop between guides 21 and 22 and 23 and 24, and passes laterally between a series of vertically arranged folding rolls, which hereinafter will be described in detail. The folding roll 20 and stop guide 19 are carried by arms 25 pivoted at 26, said arms being connected for simultaneous movement. A spring 27 is attached to an extension of an arm 25 and is adapted to be engaged with either one of two lugs 28 or 29 of the frame 2. When the legal or parallel folder is thrown out of the way, the spring 27 is engaged with the lug 28, as shown in Fig. 1, and when said folder is in operative position, the spring 27 is engaged with the lug 29, as shown in Fig. 2. The receiving end of the stop guide 19 comes opposite to the spaces between the coöperating rolls 13 and 18 and 18 and 20, and bears the same angular relation to said rolls as the stop guide 16, but on the opposite side of the rolls 13 and 18. When the legal or parallel folder is in working position, the sheet, after receiving the initial or primary fold, passes into the guide 19 the predetermined distance, and when its movement is arrested, a continued movement of the sheet between the rolls 13 and 18 causes said sheet to buckle or flex towards the rolls 18 and 20, which form the second fold in the sheet parallel with the primary fold. This constitutes the legal or parallel folding of the sheet or paper. When it is required to adjust or arrange the machine for letter folding, the stop guide 19 and folding roll 20 are thrown out of the way, as indicated in Fig. 1.

The guides 21 and 22 consist of bars or strips attached at their lower ends to a pivoted plate 30 admitting of the guides being thrown out of the way when the machine is used for legal or parallel folding. The strips or bars 21 and 22 are spaced apart and their upper ends flared to insure entrance of the sheet or paper between them. The guide rollers 23 and 24 are located some distance from the guides 21 and 22 and are of conical form, being upwardly tapered to facilitate the entrance of the paper between them as it drops from the folding rolls 13 and 18. One of the rolls, as 23, is positively driven for the purpose of advancing the sheet to the transverse folding mechanism. As shown, a belt 31 connects the roll 23 with the inner middle roll 32. A plate 33 is located near the rolls 23 and 24 and is vertically adjusted so as to insure proper delivery of the folded sheet to the transverse folding mechanism. The roll 23 is mounted on an arm 34, whereas the roll 24 is mounted upon a bell crank lever 35. A spring 36, attached to an extension 37 of the arm 34, is adapted to be attached to a lug 38 of the main frame so as to hold the roll 23 against the roll 24. A brace 39 pivotally connected at one end to the bell crank lever 35 is adapted to be fitted into a notch 40 of the main frame 2 so as to fix the position of the rolls 23 and 24 with reference to the guides 21 and 22 and the transverse folding mechanism when the latter or transverse folding mechanism is in operative position. When the brace 39 and the spring 36 are disengaged from the main frame, the rolls 23 and 24 may be thrown out of the way.

Folding rolls 41 and 42 are located at opposite sides of the roll 32 and are mounted in yieldable bearings. Another folding roll 43 is located exterior to the roll 32 and in transverse alinement therewith and is similarly mounted in yielding bearings. A journal of the roll 32 is projected upward and provided with a bevel gear 44 which is in mesh with a companion bevel gear 45 loose upon an end of the shaft or extended journal 46 of the roll 13. The loose gear 45 is provided with a half clutch or one face which is adapted to mesh with a corresponding half clutch at the inner end of a collar 47 mounted upon the shaft 46 and adapted to be secured thereto by means of a set screw 48. The space between the vertical rolls 41 and 32 is in the same plane with the space formed between the rolls 13 and 18 and in the same plane with the space formed between the guides 21 and 22 and the rolls 23 and 24. A stop guide 49 is arranged opposite to the space formed between the rolls 41 and 32 and 32 and 43. A similar stop guide 50 is located opposite to the spaces formed between the coöperating folding rolls 32 and 42 and 32 and 43. A curved guide 51 is located opposite to the inner side of the folding roll 42 and directs the folded letter or sheet around said roll from one side to the other. Flat springs 52 support the guide 51 and are attached at one end to a convenient portion of the main frame.

The letters, sheets or the like, when folded longitudinally and transversely, are received in a rack 53 which is located at one side of the machine about in longitudinal alinement with the transverse folding mechanism. The rack 53 consists of a trough in which is slidably mounted a support 54 which is moved along the rack as the letters are received therein. The inner end of the rack is closed by means of a plate 55, the inner end being curved, as shown at 56, to provide a flared entrance to insure delivery of the folded letters or sheets into 53 the rack.

When the machine is adapted to be used for letter or transverse folding, the legal or parallel folder is thrown out of the way, as hereinbefore stated, and illustrated in Fig. 1, and the guides 21 and 22 and the guide rolls 23 and 24 are thrown into position, as indicated in Fig. 3. The collar 47 is moved upon the shaft 46 to throw its half clutch into engagement with the coöperating half clutch of the gear 45, thereby causing the parallel and transverse folding mechanisms to operate simultaneously. Upon imparting motion to the shaft 46 by means of the crank wheel 57 fast upon said shaft, the folding rolls and the feeding mechanism are set in motion. The sheets are fed from the holder 3, one at a time, by means of the feed roll 8 and pass between the companion guide members 14 and 15 and between the rolls 12 and 13 into the guide 16 until the advancing edge of the sheet comes in contact with the stop 17, when the sheet will buckle or flex and the fold caught between the rolls 13 and 18, and the sheet, thus doubled upon itself, or longitudinally folded, passes between the guides 21 and 22 and the guide rolls 23 and 24, and by the action of the latter is moved laterally between the rolls 32 and 41, thence into the stop guide 49, when it will be caused to buckle or flex between the rolls 43 and 32 in a manner similar to the operation of the rolls 13 and 18 and the stop guide 16. The sheet with the initial transverse fold, after passing between the rolls 43 and 32, enters the stop guide 50 and is again buckled or flexed and caused to pass between the rolls 32 and 42, thereby completing the second transverse fold as in letter folding. The folded letter or sheet, as it emerges from between the rolls 32 and 42, comes in contact with the guide 51 and is deflected around the inner side of the roll 42 and caused to enter the rack 53 in which the letters are stacked.
To prevent slipping of the coöperating rolls, they are provided at one end with intermeshing gear wheels which are secured to an end portion of the respective shafts so as to turn therewith. The hubs of the gear wheels face inward and the rubber or other composition or material from which the rolls are formed, is fitted over the hubs of the gear wheels and against the inner faces of the latter to prevent possible slipping and economize in space. The machine may be operated either by hand or other suitable power. The rolls 23 and 24, in addition to acting as guides, also serve to move the sheet laterally after the initial longitudinal fold.

It is to be understood that the several stop guides 16, 19, 49 and 50 are constructed substantially alike, each comprising spaced guide members and an adjustable stop, the latter serving to limit the advance of the sheet to cause it to buckle or flex at a point corresponding with the predetermined line of fold.

Figures 9, 10, 11, 12:
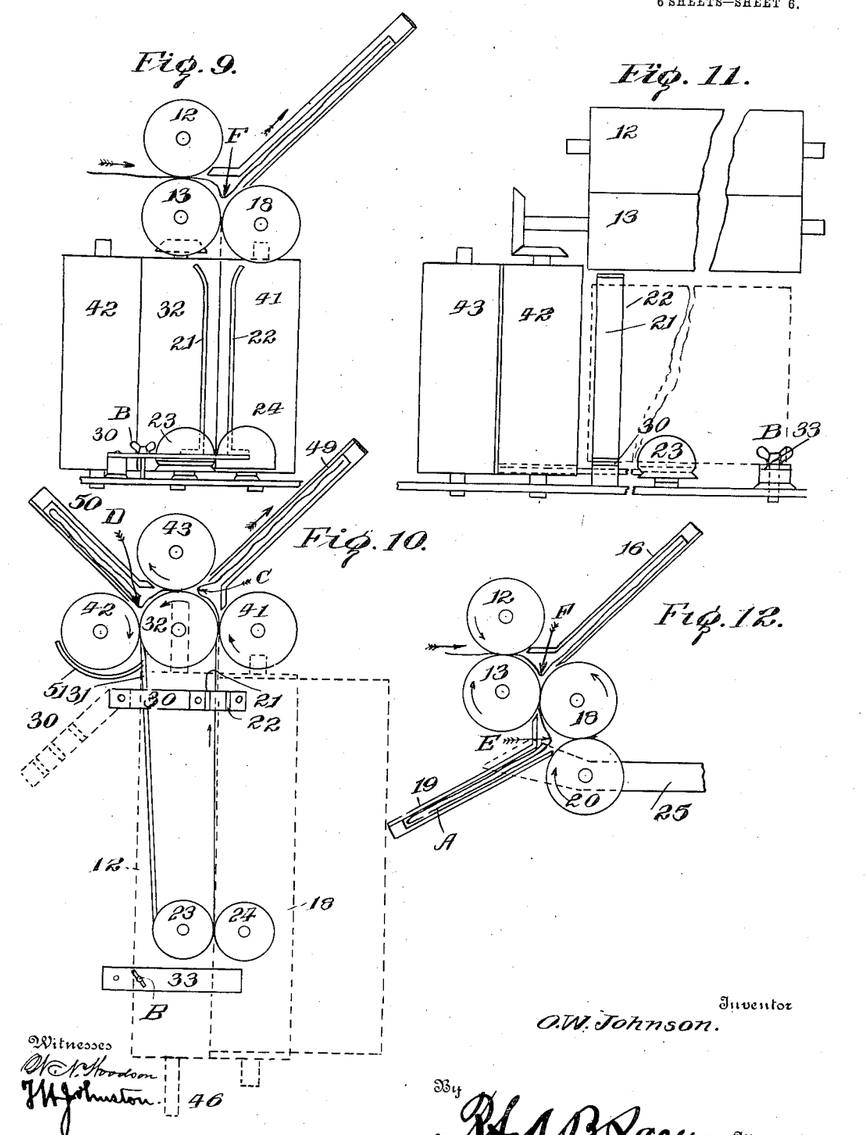
Figs. 9, 10, 11 and 12 are detail views, in the nature of diagrammatic views illustrating the folding rolls and creasing mechanism and the sheet in operative relation thereto, all as will be hereinafter specifically described. It is to be understood clearly that the last named views are in the nature of diagrammatic views merely and omit such parts as are not necessary in views of such character. For instance Fig. 11 omits the stop guides 50 and 49.

In describing the course of the paper sheet as it is fed into the folding mechanism until it is deposited into the stacker, reference is first to be had to Fig. 9 of the drawing. This view shows a top feed roll 12 and folding rolls 13 and 18 and also a stop-guide or folding plate for the three rolls just mentioned which constitute the first folding series. The view also shows the cones 23 and 24 in position underneath said rolls the guide arms 21 and 22 in position on their supporting plate 30, and it also shows the position of the paper as it passes the two rolls 12 and 13. From this view it will be seen that as the paper passes between the rolls 12 and 13, the former of which constitutes a feed roll, it is fed therethrough into the folding plate 16, where it is stopped at a predetermined point and is caused to buckle at the point F. As soon as it is thus buckled the creased fold thereof will be caught between the roll 13 and the roll 18 which is in slightly a lower plane than the roll 13. It will then pass downwardly from the two rolls 13 and 18 down on to the leveling plate 33, between the guide arms 21 and 22 and is then ready for the cross or lateral feed into the rolls 32 and 41. Next Fig. 10 is to be observed. This view shows the same parts as Fig. 9, but in plan view with all parts in their proper relative positions and the sheet of paper also shown in both dotted and dark lines in the various positions it must assume as it is folded the next two times and passed out of folding plate 51 into the stacker (not shown). The paper after dropping on to the cones 23 and 24 as before described is run laterally by said rollers between the two rolls 41 and 32 and is fed into the folding plate 49 where it is caused to buckle as indicated at the point C as soon as one end strikes the stop in the folding plate, and it is thus deflected towards the two rolls 32 and 43 and is passed in a folded position therefrom up into the folding plate 50, where it is again stopped at the end of the sheet and caused to again buckle at the point indicated by D. It is then caught and pressed and forced out against the stacking plate and is carried around by the friction of the paper on the roll and forced into the stacker shown in other views of the drawing. This Fig. 10 also shows the leveling plate and the adjusting screw B which raises or lowers the plate to admit of leveling the sheet so that it will be folded correctly when passed into the second folding series just described.

Fig. 11 shows the front view of some of the parts illustrated in Fig. 9, in other words as the machine would appear when looking at it from where the paper is fed in between the rolls 12 and 13. It also shows the paper in dotted lines in position after the first fold between the guide arms 21 and 22, and on the cones and leveling plate ready for feeding laterally to the side series of folding rolls 41, 32 and 42.

Fig. 12 illustrates the principle of the legal fold as used on the machine of my invention, the dark lines show the paper in position. The point F' shows the buckle for the first fold and the reference letter E' indicates the buckle for the second fold, after the paper has been fed into the second folding plate 19. From this detail description the operation of the machine on a paper sheet is believed to be manifest.

Having thus described the invention, what is claimed as new is:

1. In a paper folding machine of the character specified, the combination of longitudinal and transverse folding mechanisms, means for guiding the paper from the longitudinal folding mechanism to the transverse mechanism, a second longitudinal folding mechanism for effecting an additional longitudinal fold in the sheet, and means for moving said last named mechanism into and out of the way of the sheet whereby it may either receive the sheet to effect the said additional longitudinal fold or allow the sheet to pass it and be received by the guiding mechanism and thence pass to the transverse folding mechanism.

2. In a machine for folding letters and the like, the combination of longitudinal and transverse folding mechanisms, the longitudinal folding mechanism comprising a movable part which may be thrown into and out of action, a movable guide mechanism between the longitudinal and transverse folding mechanisms to be thrown into and out of action, said guide mechanism comprising means for feeding the longitudinal folded sheet to the transverse folding mechanism, and means for throwing the longitudinal and transverse folding mechanisms into and out of action.

3. In a machine for folding letters and the like, the combination of longitudinal and transverse folding mechanisms, an intermediate mechanism for directing and advancing the longitudinally folded sheets to the transverse folding mechanism, and a movable folding roll and stop guide constituting a part of the longitudinal folding mechanism, and means coöperating therewith to hold the same either in or out of operative position.

4. In a machine for folding letters and the like, the combination of longitudinal and transverse folding mechanisms, an intermediate mechanism for directing and advancing the longitudinally folded sheets to the transverse folding mechanism, a movable support for a folding roll and stop guide of the longitudinal folding mechanism, a spring attached to the movable support, and stops on the main frame adapted to coöperate with the spring for holding the movable support in either one of its extreme positions.

5. In a paper folding machine of the type specified, the combination of mechanisms for effecting a first longitudinal fold in a sheet, transverse folding mechanism, guiding mechanism for passing the longitudinally folded sheet to the transverse folding mechanism, and mechanism for effecting a second longitudinal fold in the sheet, said last named mechanism being arranged to be swung into and out of the way of the sheet whereby it may either receive the sheet and effect the second longitudinal fold or allow the sheet to pass it and be received by the guiding mechanism and thence pass to the transverse folding mechanism.

6. In a paper folding machine of the type specified, the combination of longitudinal folding mechanism, transverse folding mechanism and guiding mechanism designed to pass the sheet from the longitudinal folding mechanism to the transverse folding mechanism, a second longitudinal folding mechanism, and means for moving the guide out of the way of the second folding mechanism.

7. In a paper folding machine of the type specified, the combination of mechanism for effecting the first longitudinal fold in a sheet, said mechanism being arranged to drop a folded sheet therefrom, a transverse folding mechanism, guides arranged to receive the paper dropped from the first longitudinal folding mechanism, a second folding mechanism arranged to effect the second longitudinal fold in a sheet, and means for moving either said last named longitudinal folding mechanism or guides into operative position to receive the longitudinally folded sheet from the first named folding mechanism.

8. In a paper folding machine, the combination of longitudinal folding mechanism, said mechanism including means for effecting the first longitudinal fold in a sheet and said means embodying two creasing rolls, a stop guide arranged to receive the folded sheet from said rolls to effect the second buckling or flexing of the sheet, a third roll arranged to contact with one of the first named rolls to effect the second creasing of the folded sheet, and means for moving the said stop guide and third roll out of operative relation to the two first named rolls.

9. In a paper folding machine, the combination of longitudinal folding mechanism including two rolls designed to crease and buckle a sheet and to feed the same therefrom, a stop guide designed to receive the folded sheet and to effect a second buckling or flexing of the same, a third roll arranged to coact with one of the first named rolls to feed the twice folded sheet therefrom, and hinged arms carrying said stop guide and third roll and arranged to hold the same in operative and inoperative relations with respect to the two first named rolls.

10. In combination, coöperating rolls, a stop guide arranged upon one side thereof, means for advancing letters or sheets to said rolls, a third roll acting jointly with one of the said coöperating rolls, a movable support, a folding roll and stop guide carried by said movable support, and a spring attached to the movable support and adapted to coöperate with projections of the main frame to hold the roll and stop guide carried by the movable support either in or out of operative position.

11. In a paper folding machine, the combination of longitudinal folding mechanism, a transverse folding mechanism, and an intermediate guide mechanism for directing the longitudinally folded sheets to the transverse folding mechanism, said guide mechanism comprising coöperating rolls arranged side by side and having their upper ends tapered.

12. In combination, a longitudinal folding mechanism, a transverse folding mechanism, an intermediate guide mechanism comprising complemental rolls, an approximately bell crank lever forming a support for one of said rolls, a brace coöperating with said bell crank lever to fix its position, a pivoted support for the other roll, and a spring acting with said pivoted support to hold its roll in engagement with the roll carried by said bell crank lever.

13. In combination, a longitudinal and a transverse folding mechanism, an intermediate guide mechanism for directing the longitudinally folded sheets to the transverse folding mechanism, said guide mechanism comprising complemental rolls, and a vertically adjustable support for properly positioning the longitudinally folded sheets between said complemental rolls.

14. In a paper folding mechanism, the combination of longitudinal folding mechanism, transverse folding mechanism, a lateral transferring mechanism for passing the longitudinally folded sheets to the transverse folding mechanism, guides arranged to guide the longitudinally folded sheet to the lateral transferring mechanism, and means for moving said guides out of operative relation to the folding mechanisms.

15. In a paper folding machine, the combination of longitudinal folding mechanism arranged to drop a sheet therethrough, transverse folding mechanism, a lateral transferring device for passing the sheets to the transverse folding mechanism, spaced apart vertical fingers arranged to receive the sheets dropped from the longitudinal folding mechanism, in operative relation for action by the lateral transferring device, and means for moving said fingers into and out of operative relation to said longitudinal folding mechanism.

16. In a paper folding machine, the combination of longitudinal folding mechanism arranged to drop a sheet therethrough, transverse folding mechanism, a lateral transferring device for passing the sheets to the transverse folding mechanism, and spaced apart vertical fingers arranged to receive the sheets dropped from the longitudinal folding mechanism in operative relation for action by the lateral transferring device, said fingers being arranged to be swung laterally out of operative relation to the folding mechanisms.

17. In a paper folding machine, the combination of longitudinal folding mechanism, transverse folding mechanism, and cones arranged to receive the sheet from the longitudinal folding mechanism and to feed the same to the transverse folding mechanism, said cones being pivotally mounted whereby they may be swung out of operative relation to the folding mechanism.

18. In a paper folding machine, the combination of longitudinal folding mechanism, transverse folding mechanism, a lateral transferring device designed to pass the sheets from the longitudinal folding mechanism to the transverse folding mechanism, and including two rollers normally in vertical alinement and underneath the longitudinal folding mechanism and designed to receive a sheet dropped therefrom, said rollers being also in horizontal alinement with the transverse folding mechanism, a bell crank lever supporting one of said rollers, means connected to said lever for holding the said roller supported thereby into operative relation with respect to the folding mechanisms, and means for pressing the other roller yieldingly against the first named roller.

19. In a paper folding machine of the character set forth, the combination of the first series of rolls, the second series of rolls, cones for feeding the folded sheet from one series to the next, and the upright guides for holding the sheet while passing from the first series to the second series, and means whereby said guides may be swung out of the way.

20. In a paper folding machine, the combination of a series of rollers for producing the first fold in a sheet, a second series of rollers for producing a second fold at right angles to the first fold and cones arranged side by side underneath the first series of rollers and arranged to feed the sheet laterally therefrom to the second series of rollers.

In testimony whereof I affix my signature in presence of two witnesses.

OLIVER W. JOHNSON. [L. S.]

Witnesses:
H. A. WAUGEREM,
H. C. DRESSLER.